United States Patent [19]
White

[11] Patent Number: 5,137,252
[45] Date of Patent: Aug. 11, 1992

[54] ANGULAR PIVOTING POWER STEERING DEVICE

[75] Inventor: Hollis N. White, Hopkinsville, Ky.

[73] Assignee: White Hydraulics, Inc., Hopkinsville, Ky.

[21] Appl. No.: 702,753

[22] Filed: May 20, 1991

[51] Int. Cl.⁵ .......................................... F1KL 31/122
[52] U.S. Cl. .......................................... 251/14; 251/59; 137/625.66
[58] Field of Search ...................... 137/625.66, 625.63, 137/625.44, 625.45; 251/59, 14

[56] References Cited

U.S. PATENT DOCUMENTS

| | | | |
|---|---|---|---|
| 648,695 | 5/1900 | Krone | 251/59 X |
| 3,202,179 | 8/1965 | Vockeroth | 251/59 X |
| 3,752,041 | 8/1973 | Smith | 251/59 X |
| 4,569,372 | 2/1986 | Blank | 137/625.66 |
| 4,858,714 | 8/1989 | White | 91/434 X |

*Primary Examiner*—Alan Cohan
*Attorney, Agent, or Firm*—Woodling, Krost & Rust

[57] ABSTRACT

A power steering device using a generally triangular valve member selectively pivoted by the pressurization of two chambers on either side of such valve member.

14 Claims, 2 Drawing Sheets

ANGULAR PIVOTING POWER STEERING DEVICE

FIELD OF THE INVENTION

This invention relates to a valve for power steering and other hydraulic devices needing selective interconnection of fluid passages.

BACKGROUND OF THE INVENTION

Power steering valves are customarily rotary elements which cooperate with a housing in order to selectively valve a remotely located steering actuator for a motor vehicle. A centering metering mechanism may or may not be utilized with such valves. U.S. Pat. No. 4,858,714, Hydrostatic Steering Device issued Aug. 29, 1989 to Hollis N. White, discloses a rather complex rotary power steering device wherein the rotary valve is contained within the metering rotor for the steering unit. The preferred type of gerotor steering mechanism in U.S Pat. No. 4,858,714 has a 360° extension of the metering mechanism about the valve. This type of metering mechanism is relatively inefficient both for the 360° extent of the metering mechanism and in addition for the complicated nature of the valve.

SUMMARY OF THE INVENTION

It is an object of this invention to reduce the size of a hydrostatic steering device.

It is an object of this invention to improve the efficiency of a power steering device.

It is an object of this invention to simplify the construction of power steering devices.

It is an object of this invention to strengthen power steering devices.

Other objects and a more complete understanding of the invention may be had by referring to the following description and drawings in which:

DESCRIPTION OF THE PREFERRED EMBODIMENT

Figure 1:
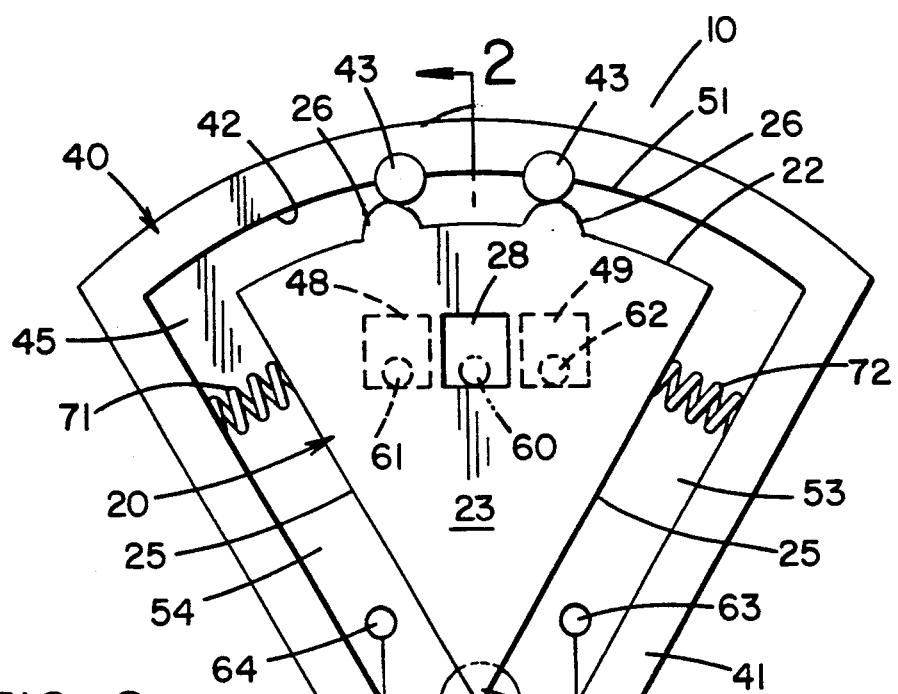
FIG. 1 is a lateral cross sectional view of a hydrostatic steering device incorporating the invention of the application.

The invention of this application relates to an improved hydrostatic steering valve for use in a vehicle having a remote steering actuator. The invention will be described in its preferred embodiment of a pressure operated angular pivot member valve.

The hydrostatic steering valve 10 includes an angular pivot member 20, a housing 40, and an input means 60.

The angular pivot member 20 is the main operative part for the hydrostatic steering valve 10. The angular pivot member 20 includes an inner edge 21, an outer edge 22, two flat surfaces 23, and two edges 25.

The inner edge 21 of the angular pivot member 20 forms the pivot 50 for the angular pivot member. This pivot 50 can be around a point or otherwise a semi-circular pivot member (shown in the drawings). In any event the inner edge 21 of the angular pivot member 20 forms a fluidic seal to the body 41 of the housing 40 at the pivot 50 in a manner to allow for the angular rotation or pivoting of the angular pivot member 20 about such point while at the same time preventing the flow of fluid past such edge 21.

Figure 3:
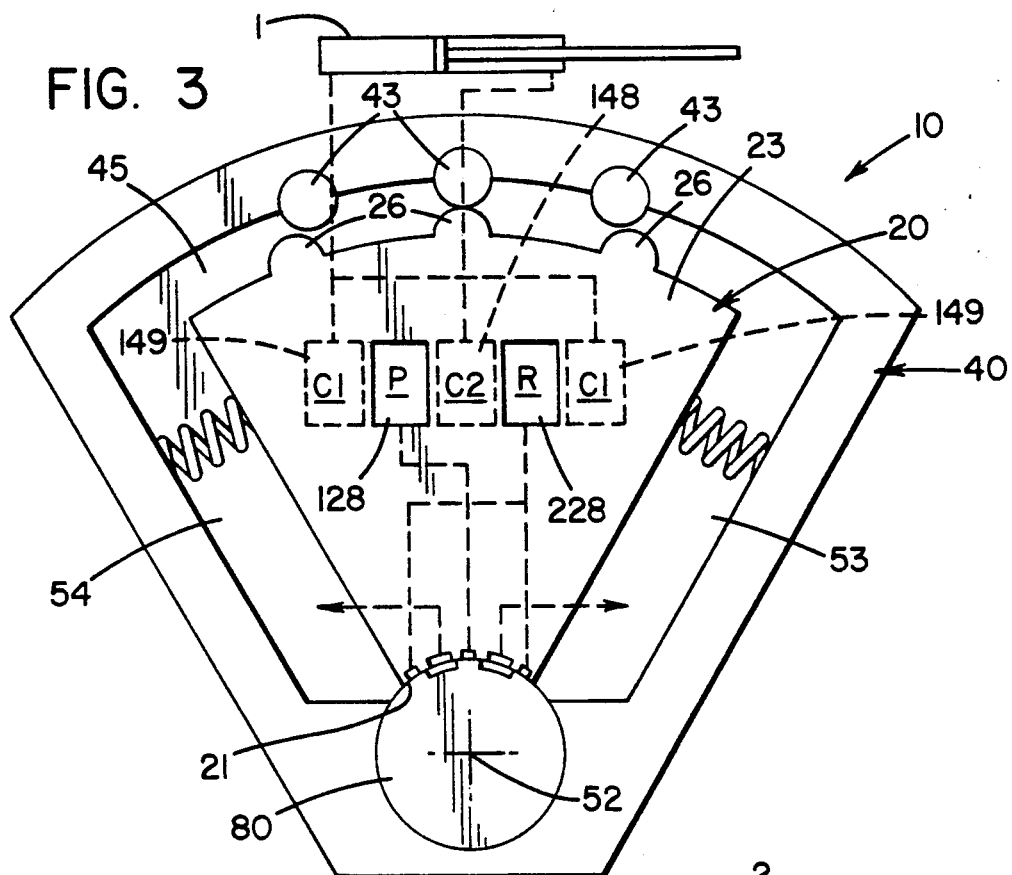
FIG. 3 is a lateral cross sectional view of a modified embodiment of the gerotor steering device; and, FIG. 4 is a further modified embodiment of the power steering device.
Figure 4:
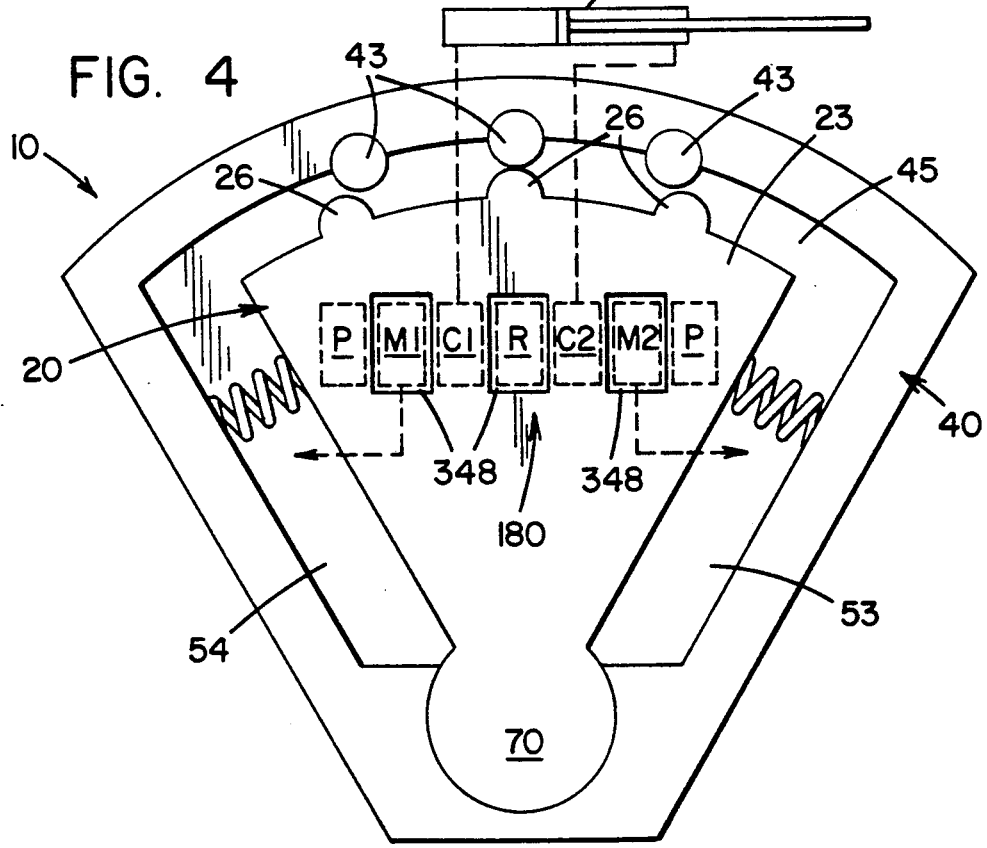

The outer edge 22 of the angular pivot member 21 forms a moveable seal with the opposing surface 42 of the housing 40. This seal 51 is such that the outer edge 22 of the angular pivot member 20 can move laterally in respect to the opposing surface 42 of the housing 40 while still retaining the seal 51. In the particular embodiment shown, this seal is provided by the inclusions of lobes 26 on the outer edge of the angular pivot member with vanes 43 incorporated within the opposing surface 42 of the housing 40. The geometry of the lobes 26 and vanes 43 are such that the seal 51 is provided between the outer edge 22 and the opposing surface 42 for the expected angular pivoting movement of the pivot member 20 about the pivot 50. In the particular embodiment of FIG. 1, the seal is provided by the inclusion of two lobes and two vanes. This allows for a greater number of degrees of possible movement for the angular movement than a single vane would. In the embodiment of FIGS. 3 and 4, the seal is provided by the inclusion of three lobes 26 and vanes 43. This allows for an even increased angular movement. This is desirable in FIGS. 3 and 4 because of the increased valving requirements in such figures.

Figure 2:
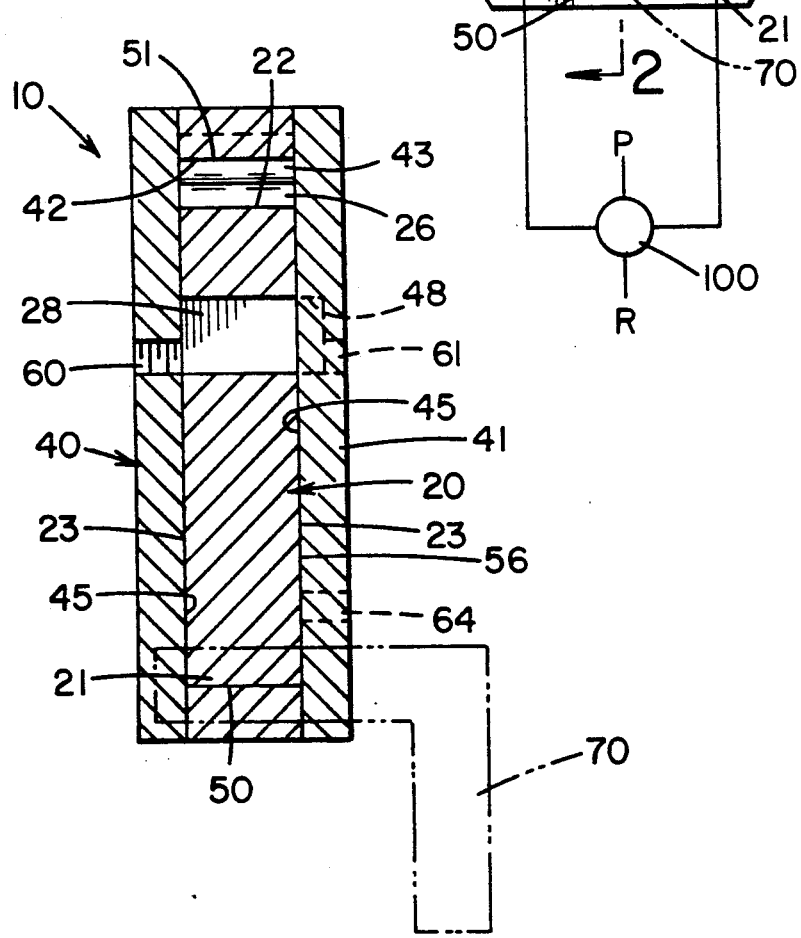
FIG. 2 is a longitudinal cross sectional view of the power steering device of FIG. 1 taken generally along lines 2—2 of that figure.

The seal 51 cooperates with the pivot 50 in order to create two chambers 53, 54 on either side of the angular pivot member 20 between such angular pivot member 20 and the housing 40. Upon pressurization of either chamber 53, 54 (or a sufficient pressure differential therebetween), the angular pivot member 20 will angularly pivot about the pivot 50 away from such pressurized chamber 53, 54. This accomplishes the selective pivoting of the angular pivot member 20 in respect to the housing 40. (If desired a separate manual handle 70 can be provided in order to physically move the angular pivot member 20. This is shown in FIGS. 1 and 2.)

The selective valving for the two chambers 53, 54 is provided by a remote valve 100, preferably located right at the steering wheel 101. The remote valve 100 is connected to the valve 10 (and the two chambers 53, 54 respectively) by two ports 63, 64. Since the steering valve 10 needs but a low volume at a low pressure in order to pivot the angular pivot member 20, the requirements for the remote valve 100 are limited. As an example of this, the remote valve 100 may need only a few cubic inches of fluid per minute (occasionally at maximum draw) at 50 PSI to operate the steering valve 10. (This is in contrast with the five gallons per minute at 1500 PSI that the steering actuator may require to flow through the steering valve 10.) Due to these greatly reduced requirements, hydrostatic steering can be utilized in more applications than previously (smaller size) and at a lower cost. Note that due to their separation, the remote valve 100 and steering valve 10 may also utilize differing pressure media for operation.

The flat surface 27 of the angular pivot member 20 is next to the flat surface 45 of the housing 40. This provides a combined plane 56 on one side of the angular pivot member 20 for valving to occur. In the preferred embodiment of FIGS. 1 and 2, a single valving opening 28 is located on the flat surface 27 of the angular pivot member 20 while two valving openings 48, 49 are incorporated as second valving openings in the flat surface 45 of the housing 40. In this particular embodiment, the valving opening 28 is normally out of alignment with either opening 48, 49 such that there is no fluid passage through the valve. Upon pivoting of the angular pivot member 20, the valve opening 28 is selectively connected with either opening 48, 49 depending upon the direction of pivoting of the angular pivot member 20. The valve opening 28 is interconnected to one port 60 in the housing 40 at all times. This communication is established by locating the port 60 leading through the flat surface 45 of the housing 40 at a location which is continually swept by the valve opening 28 of the angular pivot member. It is preferred that this opening 28 extends through the depth of the angular pivot member 20. This has the effect of partially pressure balancing such pivot member 20 so as to reduce the force necessary to pivot such member 20. The second valve openings 48, 49 are each interconnected to their own port 61, 62 respectively in the housing 40. Due to this interconnection, the pivoting of the angular pivot member 20 serves to interconnect the port 60 with either port 61, 62 depending on the direction of pivoting of the angular pivot member. This provides the valve for the device 10.

It is preferred that some sort of preloading mechanism be included with the valve 10 so as to align the pivoting member 20 into a present known neutral condition. In the particular embodiments shown, two centering springs 71, 72 extending between the angular surfaces 25 of the angular pivot member 20 and the housing 40 serve to align the valve openings in a default closed valve condition with the valve opening 28 being located between the valve openings 48, 49 so as to not be in communication with either.

In the preferred embodiment of FIG. 1, the rotation of the angular pivot member 20 accomplishes the valving for the steering actuator in two ways. The first way is the selective pressurization of either chamber 53, 54 by the remote valve 100. This allows the angular pivot member 20 to be angularly rotated from a remote location. In the particular embodiment of FIG. 1, the rotation can also be accomplished in a second way by physical manipulation of the manual handle 70 which is interconnected to the angular pivot member 20 near the pivot point 50. This allows for a direct valving manipulation.

The device of FIGS. 1 and 2 is a reasonably simple application of the invention incorporating the interconnection of a single port 60 with one of two alternate output ports 61, 62. This valving is accomplished through the selected pressurization of two further ports 63, 64 from a remote location. These figures are thus a rather simple application of the invention. A more complicated version of the invention is shown in FIGS. 3 and 4 respectively.

In the invention of FIGS. 3 and 4, the valve 10 interconnects pressure and return to either cylinder 1 or cylinder 2 of a hydraulic steering device with the selected pressurization of the two chambers 53, 54 accomplished through pilot valving 80 at the pivot 50 between the inner edge 21 of the angular pivot member 20 and the pivot point 52 of the housing 40. The preferred pivot valving 80 is accomplished by having the pressure and return ports interconnected to the inner edge 21 of the angular pivot member 20 within the angular pivot member 20. There are also interconnections within the angular pivot member 20 to the two chambers 53, 54 on either side of the angular pivot member 20. This centralization of passages allows for one complicated part--the pivot member 20. This simplifies the manufacturing of the valve 10, particularly if the pivot member 20 is made of a multiplate laminated construction (as shown). Upon the selective rotation of the pilot valving 80, either the pressure chamber 53 or the pressure chamber 54 is interconnected to pressure, with the other chamber 53, 54 interconnected to return. This accomplishes the selective pressurization of the two chambers 53, 54 in order to rotate the angular pivot member 20. The pressure and return are also respectively interconnected to two valving openings 128, 228 on the flat surface 20 of the angular pivot member 20. This interconnection is accomplished in a manner similar to that of the valve opening 28 in FIG. 1. There are two cylinder openings 148, 149 (a pair of 149) located in the flat surface 45 of the housing 40 (the two C1 valving openings 149 are interconnected together to a single port). Due to this orientation, the rotation of the angular pivot member 20 selectively interconnects the pressure 128 or return 228 to the cylinder 1 or cylinder 2 connections as appropriate. This accomplishes the power steering valving for the device.

The embodiment of FIG. 4 is similar except that the pilot valving 180 provides the full gamut metering valving, with the metering valving being interconnected to the two chambers 53, 54. This embodiment provides a full range of hydrostatic power steering features including automatic self centering of the angular pivot member 20. In this device, the openings pressure (P), metering one (M1), cylinder one (C1), return (R), cylinder two (C2), and metering two (M2) are laid out on the flat surface 45 of the housing 40 with full depth valving slots 348 on the flat surface 27 of the angular pivot member 20. The openings on the flat surface 45 of the housing 40 are interconnected to ports or chambers as appropriate. Upon the rotation of the shaft to the pivot member 20, thus simultaneously valves and meters the power steering actuator in the customary manner.

Although the invention has been described in its preferred embodiment with a certain degree of particularity, it is to be understood that numerous changes can be made without referring to the invention as hereinafter claimed.

What is claimed is:

1. In a hydraulic power steering valve having a rotary pivot member rotatable about a point by pressure cells and the rotary pivot member providing a rotary valve between two fluid connections, the improvement of the rotary pivot member extending less than 360° about the point to provide for an angular pivot member.

2. The power steering valve of claim 1 characterized by the addition of centering springs, and said centering springs biasing the rotary valve into a predetermined condition.

3. The power steering valve of claim 1 characterized by the addition of a means to pressurize the pressure cells to selectively rotate the pivot member about the point.

4. The power steering valve of claim 1 characterized by the addition of a manual handle, and said manual handle being connected to the rotary pivot member such that rotation of said manual handle rotates the rotary pivot member.

5. The power steering valve of claim 4 characterized by the addition of a means to pressurize the pressure cells to selectively rotate the pivot member about the point.

6. The power steering valve of claim 1 wherein the rotary pivot member has an outer edge and is contained in an opening having an opposing surface and characterized in that the outer edge of the rotary pivot member is lobed and the opposing surface of the opening has vanes.

7. The power steering valve of claim 1 characterized by the addition of a manual handle, said manual handle having an outer surface, the rotary pivot member having an inner edge at the pivot, said outer surface of said manual handle being located next to said inner edge of the rotary pivot member, said outer surface of said manual handle and said inner edge of the rotary pivot member forming a pilot valve at their joint, and said pilot valve selectively pressurizing the pressure cells to rotate the pivot member about the point.

8. The power steering valve of claim 7 characterized by the addition of centering springs, and said centering springs biasing the rotary valve into a predetermined condition.

9. A hydraulic power steering valve comprising an angular pivot member, said angular pivot member having a pivot and an outer edge, said outer edge of said angular pivot member extending for less than 360° about said pivot, a housing, said housing having two ports and an opening with a pivot point and an opposing surface, said angular pivot member being in said opening in said housing with said pivot engaging said pivot point and said outer edge adjoining said opposing surface, a seal, said seal extending between said outer edge of said angular pivot member and said opposing surface of said housing to create two chambers on either side of said angular pivot member, a valve opening, said valve opening being in said angular member, means to connect said valve opening to one fluid port in the housing, a second valve opening, said second valve opening being in said housing, said second valve opening being connected to said second fluid port in the housing, the angular movement of said angular pivot member in respect to said housing about said pivot aligning said valve opening with said second valve opening to valve the device and means to selectively pressurize said two chambers so as to angularly move said angular pivot member in respect to said housing about said pivot.

10. The power steering valve of claim 9 characterized in that said outer edge of said angular pivot member has lobes, said opposing surface of said housing has vanes, and said seal comprising at least one lobe contacting at least one vane.

11. The power steering valve of claim 9 characterized by the addition of a manual handle, and said manual handle being connected to said angular pivot member such that rotation of said manual handle rotates said angular pivot member.

12. The power steering valve of claim 9 characterized by the addition of a manual handle, said manual handle having an outer surface, said angular pivot member having an inner edge at the pivot, said outer surface of said manual handle being located next to said inner edge of said angular pivot member, said outer surface of said manual handle and said inner edge of said angular pivot member forming a pilot valve at their joint, and said pilot valve selectively pressurizing the pressure cells to rotate said angular pivot member about the point.

13. A hydraulic power steering valve comprising an angular pivot member, said angular pivot member having a pivot and an outer edge and a surface, said outer edge of said angular pivot member extending for less than 360° about said pivot, a housing, said housing having two ports and an opening with a pivot point and an opposing surface and a flat surface, said angular pivot member being in said opening in said housing with said pivot engaging said pivot point and said outer edge adjoining said opposing surface and said surface adjoining said flat surface, said outer edge of said angular pivot member having lobes, said opposing surface of said housing having vanes, said lobes of said pivot member contacting said vanes of said housing to form a seal, said seal extending between said outer edge of said angular pivot member and said opposing surface of said housing to create two chambers on either side of said angular pivot member, a valve opening, said valve opening being in said surface of said angular pivot member, means to connect said valve opening to one fluid port in the housing, a second valve opening, said second valve opening being in said flat surface of said housing, said second valve opening being connected to said second fluid port in the housing, the angular movement of said angular pivot member in respect to said housing about said pivot aligning said valve opening with said second valve opening to valve the device and means to selectively pressurize said two chambers so as to angularly move said angular pivot member in respect to said housing about said pivot.

14. The power steering valve of claim 13 characterized by the addition of centering springs and said centering springs extending between said angular pivot member and said housing to bias the valve opening into a predetermined condition in respect to said second valving opening.

* * * * *